2,811,416
Patented Oct. 29, 1957

United States Patent Office

2,811,416

PROCESS OF REMOVING PLUTONIUM VALUES FROM SOLUTION WITH GROUP IVB METAL PHOSPHO-SILICATE COMPOSITIONS

Edwin R. Russell, Chicago, Ill., and Arthur W. Adamson, Jack Schubert, and George E. Boyd, Oak Ridge, Tenn., assignors to the United States of America as represented by the United States Atomic Energy Commission No Drawing. Application August 26, 1944,
Serial No. 551,444

8 Claims. (Cl. 23—14.5)

The invention relates to a process of separating plutonium values from aqueous solutions. The problem of removing certain suspended and/or dissolved materials from solutions which contain these materials in small or minute concentrations often is exceedingly difficult. The removal of materials such as plutonium from solutions containing the same has been particularly hard due to the very minute concentration of plutonium which is present in most solutions containing this element.

An object of this invention is to provide a new composition which may be used as an adsorbent and to provide a method of adsorption using such composition.

It was found that plutonium values can be removed from an aqueous solution by providing an aqueous salt solution containing salt of metal selected from the group consisting of zirconium, titanium, hafnium, thorium and mixtures thereof; adding an aqueous solution of a silicate and phosphoric acid anions to said salt solution, the molar ratio of said phosphoric acid ions:metal ions:silicate ions ranging from 40:31:51 to 40:31:10,000; acidifying said aqueous salt solution whereby a precipitate forms; separating said precipitate from the aqueous solution; washing and drying said precipitate; acidifying the aqueous plutonium-containing solution to make it from 1 to 3 M in an acid selected from the group consisting of nitric acid and hydrochloric acid and from 0.02 to 0.4 M in phosphoric acid; passing said solution over said precipitate whereby the plutonium values are adsorbed by said precipitate; and separating the precipitate from the aqueous solution.

These new phosphate-silicates may be precipitated from an aqueous medium by acidifying a solution containing a soluble salt of a metal of the above group, an alkali metal silicate and phosphate. The product is a complex the exact composition of which is unknown. However examination of the product has demonstrated that its composition corresponds approximately to the general formula $(R_3(PO_4)_4)_x(RSiO_4)_y(SiO_2 \cdot nH_2O)_z$ in which R is zirconium, titanium, hafnium or thorium and $n$, $x$, $y$ and $z$ are positive numbers denoting the molecular proportions of the components. The exact value of $n$, $x$, $y$ and $z$ depends to a considerable degree upon the concentration of the respective radicals in the solution during precipitation. However it has been found that $x$ is substantially larger than $y$ and substantially smaller than $z$. Where the product is precipitated from a solution in which the silica content is low and in consequence $z$ is little greater than $x$, the product is soft and gelatinous and is not suited to adsorption methods. On the other hand where the silica concentration is higher, harder products more suited to adsorption methods are secured. Generally speaking, $z$ should be at least 5 times $x$, and in most cases $z$ will be 100, or even as much as 1000 or more times, as large as $x$. $y$ is lower than $z$ in these components, and frequently it may be as little as one-tenth or less of $x$. $n$ of course is dependent upon the degree of dehydration to which the product has been subjected. Such complex phosphate-silicate compounds are hereinafter referred to generally as phospho-silicates and specifically as zirconium phospho-silicate, titanium phospho-silicate, hafnium phospho-silicate, and thorium phospho-silicate.

The phospho-silicates as provided by the invention are particularly suitable for the adsorption of element 94, radioactive fission products and other substances having similar adsorption properties.

In the following description, the isotope of element 93 having a mass of 239 is referred to as $93^{239}$, and the isotope of element 94 having a mass of 239 is referred to as $94^{239}$. Element 94 may also be designated as plutonium, symbol Pu. Reference herein to any of the elements is to be understood as denoting the element generically, whether in its free state or in the form of a compound, unless indicated otherwise by the context.

Neutron-irradiated uranium may be prepared by reacting uranium with neutrons from any suitable neutron source, but preferably the neutron-irradiated uranium is produced by a chain reaction of neutrons with uranium.

Neutron irradiation of uranium produces $_{92}U^{239}$ which has a half-life of 23 minutes and by beta decay becomes $93^{239}$. This element has a half-life of 2.3 days and by beta decay becomes $94^{239}$. Neutron-irradiated uranium contains $93^{239}$, $94^{239}$ and a large number of radioactive fission products produced by reaction of neutrons on fissionable atoms, such as $U^{235}$ which is present in uranium from natural sources. It also contains minor amounts of other products such as $UX_1$ and $UX_2$. Inasmuch as the weight of radioactive fission products is proportional to the amounts of $93^{239}$ and $94^{239}$ formed, it is convenient to separate the desired elements when the combined amounts thereof are minute, usually being less than 0.1 percent by weight and frequently being as low as one part by weight per million parts by weight of uranium. By storing the neutron-irradiated uranium for a suitable period of time, the $93^{239}$ is converted almost entirely to $94^{239}$. Because the fission products in general are highly radioactive, it is preferred that these materials be removed.

The fission products consist of a large number of elements which may be classified into two groups; a light group with atomic numbers from 35 to 45 and a heavy group with atomic numbers from 51 to 60. The fission products with which we are particularly concerned are those having a half-life of more than three days since they remain in the neutron-irradiated reaction mass in substantial quantities at least one month after reaction. These products are chiefly radioactive isotopes of Sr, Y, Zr, Cb, and Ru of the group of atomic numbers from 35 to 45; and Te, I, Xe, Cs, Ba, La, and Ce from the group of atomic numbers from 51 to 60, inclusive.

The phospho-silicate may be prepared by acidifying a solution containing dissolved silicate, phosphate and zirconium etc., as has been stated above. For example it may be prepared by adding together an aqueous solution of a water-soluble salt of a member of the group consisting of zirconium, titanium, hafnium, and thorium, an aqueous solution of a water-soluble silicate, such as sodium silicate, and phosphoric acid. In like manner a solution of sodium silicate, zirconyl nitrate and trisodium phosphate may be acidified with an acid, such as HCl. A precipitate of the phosphate-silicate is thrown down, the precipitate is then dried, washed with water, and soaked in a suitable acid, such as concentrated nitric acid, to remove soluble impurities. After further washing and drying, a product is obtained that is composed predominantly of the complex phosphate and silicate compounds.

The preparation of the phospho-silicates may be illustrated specifically by an example of the preparation of zirconium phospho-silicate. This complex compound is prepared by adding together a dilute aqueous solution of 18.5 milligrams of zirconyl nitrate, $ZrO(NO_3)_2.2H_2O$, and sufficient sodium silicate, $Na_4SiO_4$, to form 100 milliliters of a solution having a specific gravity of 1.1. After the solution is stirred, 16 milliliters of an acid solution comprising one part by volume of concentrated $H_3PO_4$ (14.5 M) and one part by volume of $HNO_3$ (16 M) are added. The solution is again stirred and allowed to set for twenty-four hours. The resulting precipitate is air-dried for thirty-six hours and then dried at 100° C. for at least twenty-four hours. After being washed free of sodium with dilute nitric acid, such as 1 M $HNO_3$, the precipitate is soaked in concentrated nitric acid and again washed with dilute nitric acid and dried.

Products of other compositions may be secured by varying the concentration of zirconium or silicate or by using a silicate having a different $Na_2O$-$SiO_2$ ratio. For example the silicate $Na_2O.(SiO_2)_{3.3}$ or other convenient silicate may be used for this purpose.

Zirconium phospho-silicate is a white crystalline solid having a bulk density of 2. The compound is relatively inert in mineral acids although it is soluble in hydrofluoric acid. Warm saturated oxalic acid will dissolve all of the zirconium which is present as zirconium phosphate, leaving zirconium silicate. Prolonged exposure to acids changes the appearance of the compound but does not substantially affect its adsorption characteristics. Zirconium phospho-silicate is of medium hardness and has an irregular surface which gives it increased surface area for any particular particle size. The phospho-silicates of titanium, hafnium, and thorium are similar in properties to zirconium phospho-silicates and may be prepared in a similar manner.

These silicates may be used to adsorb substances of the kind present in neutron-irradiated uranium, that is, plutonium, uranium, and fission products. In using the phospho-silicate as provided by the present invention for this type of adsorption, a solution containing the plutonium, and which may contain uranium, and/or fission products is brought into contact with the phospho-silicate adsorbent by suitable means as, for example, by flowing it through a column containing the phospho-silicate adsorbent.

The phospho-silicates, and particularly zirconium phospho-silicate, have been found to have highly specific surface properties with respect to the adsorption of plutonium and other substances having similar physical and chemical characteristics. Consequently, they are particularly suitable in the separation by adsorption of plutonium from substances of the kind present in neutron-irradiated uranium, such as uranium and fission products.

In using the zirconium phospho-silicate adsorbent to separate plutonium from fission products and uranium, a solution containing the plutonium, uranium, and fission products is flowed through a suitable quantity of zirconium phospho-silicate. Where it is desired to recover $94^{239}$ from neutron-irradiated uranium by this composition, the uranium is preferably dissolved in nitric acid to form a solution comprising uranyl nitrate, plutonium, and fission products, and the plutonium is converted or established in its reduced or phosphate-insoluble state.

Preferably, the solution is acidified with a mixture of mineral acids such as a mixture which is 1 M to 3 M in $HNO_3$ (or HCl) and 0.02 M to 0.4 M in $H_3PO_4$. Acid concentrations beyond these ranges give decreased adsorption of the plutonium as does substitution of $H_2SO_4$ for $HNO_3$ or HCl, although $H_2SO_4$ may be employed with some degree of success. As little of the uranium as possible should be present in the solution undergoing adsorption for the separation of plutonium, as the presence of uranium decreases the degree of plutonium adsorption; consequently, as much as possible of the uranium is removed by any suitable means from the solution prior to the plutonium adsorption step. For example, for this purpose the method disclosed in our copending application, Serial No. 551,734, filed August 29, 1944, may be employed.

It has been found that one gram of 45–80 mesh zirconium phospho-silicate for each 50 ml. of nitrate solution is satisfactory for the adsorption of plutonium when present in tracer amounts. While it is preferable that the solution contain as little uranium as possible in order to avoid or minimize adsorption of the uranium with the plutonium, it is frequently not feasible to remove uranium. Thus a solution containing 10 percent of irradiated uranium nitrate may be treated. A bed depth of ¼ to 3 feet or more of the adsorbent is sufficient to cause substantially all of the plutonium to be adsorbed when present in tracer amounts. The adsorption of the plutonium is independent of the flow rate of the solution through the column up to a rate of flow of approximately 1.3 ml. per minute per square cm. of adsorbent. However, considerably higher flow rates may be used without seriously decreasing the adsorption of plutonium.

As the solution flows through the adsorbent mass, substantially all of the plutonium is adsorbed while large amounts of the other substances, and especially of some of the fission products, pass through the adsorbent mass and out of the column with the solution. Where a relatively deep bed of adsorbent is used, for example, of one or more feet, the adsorption of the plutonium and fission products tends to provide a layer effect, that is, chromatographic adsorption, with the plutonium being preferentially adsorbed and forming a layer in the upper portion of the adsorbent, with such fission products as are adsorbed forming layers below the plutonium (in the case of downward flow of solution through the adsorbent mass).

To remove the adsorbates from the adsorbent, it is necessary to pass wash solutions through the column which, by a continual process of desorption, readsorption, and desorption, move the various adsorbates down the column until the layer of adsorbates originally in the lowest portion of the column passes out with the wash solution and may be collected as a separate fraction. During the elution of the lowest layer, the other layers are also moving down the column but at slower rates of travel.

It has been found that certain wash solutions, such as mixed mineral acids, serve better to remove the fission products than the plutonium, while other wash solutions, such as single mineral acids, tend to remove the plutonium. Where plutonium and fission products have been adsorbed, a first wash solution of mixed mineral acids is flowed through the column to remove the fission products. It has been found that a solution 1 M to 3 M in $HNO_3$ and 0.1 M to 0.4 M in $H_3PO_4$ is most suitable for this purpose. If desired, the desorbed fission products may be collected as a separate fraction.

To remove the plutonium, wash solutions comprising a single acid are used. The higher the concentration of acid in this wash solution, the smaller the volume of wash solution needed and the faster the wash solution may be passed through the column. Preferably, the wash solution for desorption of the plutonium comprises 7 M $HNO_3$. The desorbed plutonium may be collected as a separate fraction. This plutonium fraction may include a minor amount of fission products.

As above indicated, the solution to be treated preferably is one resulting from a previous separation process in which substantially all of the uranium and moderate amounts of fission products have been removed from a solution of neutron-irradiated uranium. Where such a uranium-free solution is treated, the adsorption of the plutonium is more efficient, and there will be less fission products in the final plutonium fraction obtained by elution. Furthermore, less zirconium phosphosilicate is needed for treating such a solution, one gram of adsorbent being satisfactory for each 100 ml. of solution to be treated.

It has been found that titanium phospho-silicate tends to resist the action of sulphuric acid to a greater extent than does zirconium phospho-silicate and consequently is more suitable for use as an adsorbent when sulphuric acid is used in either the adsorption or desorption phase.

As an example of the preparation of titanium phospho-silicate, a dilute aqueous solution of 18.5 mg. of titanyl sulphate, $TiOSO_4$, and sufficient sodium silicate in an aqueous solution are added together to form 100 ml. of a solution having a specific gravity of 1.1. The solution is stirred, and 16 ml. of an acid solution comprising one part by volume of concentrated $H_3PO_4$ (14.5 M) and one part by volume of $HNO_3$ (16 M) is added. The solution is again stirred and allowed to stand for twenty-four hours. The resulting precipitate is air-dried for thirty-six hours and then dried at 100° C. for at least twenty-four hours. After being washed free of sodium with dilute nitric acid, such as 1 M $HNO_3$, the precipitate is soaked in concentrated nitric acid and again washed with dilute nitric acid and dried. Hafnium and thorium phosphate-silicates may be prepared in a similar manner.

It is contemplated that mixtures of the phospho-silicates may be used as adsorbents. This may be done by including solutions of salts of more than one member of the group consisting of zirconium, titanium, hafnium, and thorium during the preparation of the phospho-silicate. As an example of a preparation of a composition of matter containing more than one complex phosphate-silicate compound, a dilute aqueous solution is prepared containing 9.25 mg. of zirconyl nitrate, $ZrO(NO_3)_2.2H_2O$, and 9.25 mg. of titanyl sulphate, $TiOSO_4$. Sufficient sodium silicate, $Na_4SiO_4$, as an aqueous solution, is added to the first solution to form 100 ml. of a solution having a specific gravity of 1.1. This solution is stirred, and 16 ml. of an acid solution comprising one part by volume of concentrated (14.5 M) $H_3PO_4$ and one part by volume of $HNO_3$ (16 M) is added. The solution is again stirred and allowed to set for twenty-four hours. The resulting precipitate is air-dried for thirty-six hours and then dried for twenty-four hours at 100° C. After being washed free of dilute nitric acid, such as 1 M $HNO_3$, the precipitate is soaked in concentrated nitric acid and again washed with dilute nitric acid and dried.

The above detailed description is given for purposes of illustration and the invention is to be limited only by the scope of the appended claims.

We claim:

1. A process of removing plutonium values from an aqueous solution, comprising providing an aqueous salt solution containing salt of metal selected from the group consisting of zirconium, titanium, hafnium, thorium and mixtures thereof; adding an aqueous solution of a silicate and phosphoric acid anions to said salt solution, the molar ratio of said phosphoric acid ions:metal ions:silicate ions ranging from 40:31:51 to 40:31:10,000; acidifying said aqueous salt solution whereby a precipitate forms; separating said precipitate from the aqueous solution; washing and drying said precipitate; acidifying the aqueous plutonium-containing solution to make it from 1 to 3 M in acid, said acid being selected from the group consisting of nitric acid and hydrochloric acid, and also from 0.02 to 0.4 M in phosphoric acid; passing said solution over said precipitate whereby the plutonium values are adsorbed by said precipitate; and separating the precipitate from the aqueous solution.

2. The process of claim 1 wherein the plutonium values are eluted from the precipitate by contacting the precipitate with about 7 N nitric acid.

3. The process of claim 1 wherein said metal is zirconium.

4. The process of claim 1 wherein said metal is titanium.

5. The process of claim 1 wherein said metal is hafnium.

6. The process of claim 1 wherein said metal is thorium.

7. A process of separating plutonium values from fission product values contained in a mixture in an aqueous solution, comprising providing an aqueous salt solution containing salt of metal selected from the group consisting of zirconium, titanium, hafnium, thorium and mixtures thereof; adding an aqueous solution of a silicate and phosphoric acid anions to said solution, the molar ratio of phosphoric acid anions:metal ions:silicate ions ranging from 40:31:51 to 40:31:10,000; acidifying said salt solution whereby a precipitate forms; separating said precipitate from the solution; washing and drying said precipitate; acidifying the plutonium- and fission products-containing solution to make it from 1 to 3 M in an acid selected from the group consisting of nitric acid and hydrochloric acid and from 0.02 to 0.04 M in phosphoric acid; passing said acidified solution over the precipitate whereby said plutonium values and fission product values are adsorbed by said precipitate; and separating the precipitate from the aqueous solution.

8. A process of separating plutonium values from fission product values contained in a mixture in an aqueous solution, comprising providing an aqueous salt solution containing salt of metal selected from the group consisting of zirconium, titanium, hafnium, thorium and mixtures thereof; adding an aqueous solution of a silicate and phosphoric acid anions to said solution, the molar ratio of phosphoric acid anions:metal ions:silicate ions ranging from 40:31:51 to 40:31:10,000; acidifying said salt solution whereby a precipitate forms; separating said precipitate from the solution; washing and drying said precipitate; acidifying the plutonium- and fission products-containing solution to make it from 1 to 3 M in an acid selected from the group consisting of nitric acid and hydrochloric acid and from 0.02 to 0.04 M in phosphoric acid; passing said acidified solution over the precipitate whereby said plutonium values and fission product values are adsorbed by said precipitate; separating the plutonium- and fission product values-containing precipitate from the aqueous solution; contacting the separated plutonium- and fission product values-containing precipitate with a mixture of nitric acid and phosphoric acid in respective concentrations of from 1 to 3 M and from 0.1 to 0.4 M whereby the fission products are eluted from the precipitate; and then contacting the precipitate with nitric acid of a concentration of approximately 7 M whereby the plutonium values are eluted.

References Cited in the file of this patent

UNITED STATES PATENTS

| | | |
|---|---|---|
| 2,069,564 | Tiger | Feb. 2, 1937 |
| 2,204,072 | Dean | June 11, 1940 |
| 2,384,563 | Roseman et al. | Sept. 11, 1945 |

OTHER REFERENCES

Meister: "Chemicker Zeitung," vol. 29, pp. 723–725 (1905).